United States Patent [19]

House et al.

[11] Patent Number: 4,496,468

[45] Date of Patent: * Jan. 29, 1985

[54] HYDRATED HYDROXYETHYL CELLULOSE COMPOSITIONS

[75] Inventors: Roy F. House, Houston; Lonnie D. Hoover, Chappell Hill, both of Tex.

[73] Assignee: NL Industries, Inc., New York, N.Y.

[*] Notice: The portion of the term of this patent subsequent to May 18, 1999 has been disclaimed.

[21] Appl. No.: 362,672

[22] Filed: Mar. 29, 1982

[51] Int. Cl.$^3$ .......................... C09K 7/02; E21B 43/00
[52] U.S. Cl. ............................ 252/8.5 A; 252/8.55 R; 252/363.5
[58] Field of Search ............ 252/8.5 A, 8.5 C, 8.55 R, 252/363.5

[56] References Cited

U.S. PATENT DOCUMENTS

| | | | |
|---|---|---|---|
| 3,014,863 | 12/1961 | Priest | 252/8.55 |
| 3,668,122 | 6/1972 | Branscum | 252/8.5 |
| 4,046,197 | 9/1977 | Gruesbeck et al. | 252/8.5 X |
| 4,105,578 | 8/1978 | Finlayson et al. | 252/28 X |
| 4,304,677 | 12/1981 | Stauffer et al. | 252/8.55 |
| 4,330,414 | 5/1982 | Hoover | 252/8.55 X |
| 4,350,601 | 9/1982 | Mosier et al. | 252/8.55 |

FOREIGN PATENT DOCUMENTS 2000799  1/1979  United Kingdom ............ 252/363.5

OTHER PUBLICATIONS

*Natrosol,* publication by Hercules, Inc., 1969, pp. 1–4 and 6–9.

*Primary Examiner*—Herbert B. Guynn
*Attorney, Agent, or Firm*—Browning, Bushman, Zamecki & Anderson

[57] ABSTRACT

A method of activating hydroxyethyl cellulose (HEC) such that the HEC will hydrate in heavy brines having a density greater than about 13.5 pounds per gallon at ambient temperature, the activated HEC compositions so produced, and viscous well servicing compositions wherein an oleaginous liquid and a compatiblizing agent are admixed to form a viscous slurry, admixing therewith an aqueous solution of an inorganic salt which has an exothermic heat of solution, and thereafter admixing HEC therewith to form a viscous pourable composition.

10 Claims, No Drawings

HYDRATED HYDROXYETHYL CELLULOSE COMPOSITIONS

BACKGROUND OF THE INVENTION

In recent years, the practical operating range of clear brines for use in the oil and gas industry has been significantly extended by utilizing soluble zinc salts, particularly zinc bromide, so that the advantages of clear brines can now be obtained with fluids having densities as high as 19.2 pounds per gallon at ambient temperatures and pressures.

The high density clear brines are used extensively: as completion fluids to minimize plugging of perforation tunnels, to protect formation permeability, and to minimize mechanical problems; as workover fluids, for the same reasons; as packer fluids, to allow easy movement and retrieval of the packer; for underreaming, gravel-pack and sand consolidation applications; as kill fluid or ballast fluid; for wire-line work; and as drilling fluids.

Clear brines having a density of 14.2 pounds per gallon (ppg) or lower are generally formulated to contain sodium chloride, sodium bromide, potassium chloride, calcium chloride, calcium bromide, or mixtures of these salts. Clear brines having a density up to about 15.1 ppg can be formulated with calcium chloride and calcium bromide; however, if the brine must have a low crystallization temperature, then clear brines in this density range are generally formulated to contain a soluble zinc salt. Zinc bromide is preferred because brines containing it are less corrosive than brines containing zinc chloride. Clear brines having a density greater than about 15.1 ppg are formulated to contain zinc bromide.

Viscous clear fluids are sometimes desired. It is known to use hydrophilic polymeric materials such as hydroxyethyl cellulose (HEC) as thickening agents for aqueous mediums used in such well servicing fluids. However, HEC is not readily hydrated, solvated or dispersed in aqueous systems having a density greater than about 13.5 pounds per gallon without elevated temperatures and/or mixing under high shear for extended periods of time. For example, hydroxyethyl cellulose polymers are poorly hydrated, solvated or dispersed in such aqueous solutions containing one or more multivalent cation water soluble salts, such as heavy brines which are commonly used in well servicing fluids. In many cases, as for example in workover operations, the equipment available for preparing the well servicing fluids does not readily lend itself to high temperature, high shear mixing. Accordingly, it is usually necessary, if it is desired to use such thickened brines to prepare them off the well site. Moreover, HEC is generally considered as unsatisfactory and ineffective in heavy brines containing zinc bromide.

SUMMARY OF THE INVENTION

It is, therefore, an object of the present invention to provide new, polymeric compositions useful for thickening aqueous mediums, especially heavy brines having a density greater than about 13.5 pounds per gallon.

A further object of the present invention is to provide an improved, aqueous well servicing fluid.

Still another object of the present invention is to provide a liquid polymeric composition which is pourable and pumpable, easily handled and which can be used to form viscous aqueous well servicing fluids under conditions of low shear mixing.

The above and other objects of the present invention will become apparent from the description given herein and the appended claims.

In accordance with the present invention, there is provided, in one embodiment, an HEC composition for use in viscosifying aqueous liquids comprising HEC, an oleaginous liquid, water, an inorganic salt which has an exothermic heat of solution, and a compatiblizing agent.

In another embodiment of the present invention, there is provided a method of activating HEC such that the HEC will hydrate in heavy brines having a density greater than about 13.5 ppg at ambient temperatures which comprises admixing an oleaginous liquid and a compatiblizing agent together to form a viscous slurry, admixing therewith an aqueous solution of an inorganic salt which has an exothermic heat of solution to form an emulsion, and thereafter admixing HEC to form a viscous pourable composition.

Still another embodiment of the present invention is to provide viscous well servicing fluids comprising a heavy brine solution having a density greater than about 13.5 ppg and a viscosifying amount of the HEC composition of this invention.

DESCRIPTION OF THE PREFERRED EMBODIMENTS

The novel, liquid polymer containing compositions of the present invention utilize hydroxyethyl cellulose (HEC) as the primary component to effect thickening of aqueous liquids. Hydroxyethyl cellulose is a high yield, water soluble nonionic polymer produced by treating cellulose with sodium hydroxide followed by reaction with ethylene oxide. Each anhydroglucose unit in the cellulose molecule has three reactive hydroxy groups. The average number of moles of ethylene oxide that become attached to each anhydroglucose unit in cellulose is called moles of substituent combined. In general, the greater the degree of substitution, the greater the water solubility. While HEC having a mole substitution level as low as 1.5 can be used, it is preferable to use HEC having a mole substitution level of 1.8 or greater, especially 2.5 and greater. It will be understood that the particular HEC chosen will depend upon the type of liquid polymer composition, and ultimately the type of well drilling or treating fluid, desired. For example, so called surface treated HEC such as described in U.S. Pat. Nos. 3,455,714; 2,879,268 and 3,072,035 can be used with advantage. Such surface treated HEC exhibits greater dispersability in the composition. The HEC will be present in the liquid polymer containing composition in amounts from about 10 to about 30% by weight, based on the total liquid, polymer containing composition, and more preferably, from about 15 to about 25% by weight, based on the total liquid, polymer containing composition.

The oleaginous liquid used in preparing the compositions of the present invention, in general, is any hydrophobic liquid which does not cause significant swelling or thickening of the HEC. Exemplary oleaginous liquids include liquid aliphatic and aromatic hydrocarbons, particularly those containing 5 to 10 carbon atoms, diesel oil, kerosene, petroleum distillates, petroleum oils and the like. Generally speaking, the oleaginous liquid will be non-polar and have a low pour point. The oleaginous liquid will be present in the composition of the present invention in amounts from about 35 to about 55% by weight, based on the total weight of the composition, and preferably from about 40 to about 50% by weight, based on the total weight of the composition.

The liquid, polymer containing compositions of the present invention also contain a compatiblizing agent for effecting gelation or thickening of the hydrophobic liquid, emulsification of the aqueous phase, and compatiblizing of the HEC with the composition.

Non-limiting examples of compatiblizing agents include organophilic hectorites, organophilic attapulgites, organophilic sepiolites, and the like. Such organophilic clays are produced by methods and have a composition described in U.S. Pat. Nos. 2,966,506 and 4,105,578, both of which are herein incorporated by reference for all purposes. In addition, the compatibilizing agent can include finely divided siliceous materials such as fumed silica, surface treated silicas such as silane treated silicas, etc. Particularly preferred compatibilizing agents are the organophilic clays described in U.S. Pat. No. 4,105,578, incorporated herein for all purposes. Such clays are formed by the reaction of a methylbenzyl dialkyl ammonium compound, wherein the ammonium compound contains 20 to 25% alkyl groups having 16 carbon atoms and 60 to 75% alkyl groups having 18 carbon atoms, and a smectite-clay having a cationic exchange capacity of at least 75 milliequivalents per hundred grams of said clay, and wherein the amount of said ammonium compound is from about 100 to about 120 milliequivalents per hundred grams of said clay, 100% active clay basis. Non-limiting examples of such preferred organophilic clays include dimethyl dialkyl ammonium bentonite, dimethyl benzyl alkyl ammonium betonite, methyl benzyl dialkyl ammonium bentonite, and mixtures thereof, wherein the alkyl group contains at least 12 carbon atoms, preferably 16 to 18 carbon atoms, and most preferably wherein the alkyl group is derived from hydrogenated tallow. An especially preferred organophilic clay is methyl benzyl dihydrogenated tallow ammonium bentonite.

When an organophilic clay is used as the compatiblizing agent, it is preferable to use a dispersant to enhance the dispersability of the organophilic clay in the oleaginous liquid. Generally speaking, the dispersant is a low molecular weight, polar organic compound such as a lower molecular weight alcohol, a lower ketone, a lower alkylene carbonate and the like. Preferred are aliphatic alcohols having from 1 to 2 carbon atoms, ketones having from 2 to 5 carbon atoms, and mixtures thereof. Mixtures of such polar organic compounds and water can be used as well as water itself, the latter if sufficient shear is utilized to disperse the compatiblizing agent. A preferred dispersant comprises a methanol-water mixture containing from about 75 to about 98% by weight methanol and from about 25 to about 2% by weight water. The dispersant will be present in an amount of about 1.5 to about 100% by weight, based on the weight of the organophilic clay, more preferably from about 20 to about 40% by weight, based on the weight of the organophilic clay.

The compatiblizing agent will be present in the composition in amounts of from about 0.25% to about 3% by weight, based on the weight of the oleaginous liquid, preferably from about 0.5 to about 2% by weight, based on the weight of the oleaginous liquid.

The inorganic salt used in preparing the HEC compositions of this invention is any water soluble salt which has an exothermic heat of solution upon mixing the salt with water. The inorganic salt should be compatible with the aqueous liquid to which the HEC composition is to be added. Preferred inorganic salts are selected from the group consisting of calcium chloride, calcium bromide, zinc bromide, and mixtures thereof. Most preferably, the inorganic salt will be calcium chloride, calcium bromide, or a mixture thereof. The inorganic salt should be present in an amount greater than about 10% by weight of the aqueous phase (water plus inorganic salt), preferably greater than about 20% by weight of the aqueous phase, up to a maximum concentration which forms a saturated solution in the aqueous phase. Thus, for calcium chloride the maximum concentration is about 37% and for calcium bromide about 55%.

The concentration of water in the HEC composition of this invention will be such that the aqueous phase of the composition comprises from about 15% to about 55% of the composition, preferably from about 25% to about 45% of the composition.

In preparing the liquid, polymer containing compositions, it is generally desirable to admix the compatiblizing agent and the oleaginous liquid followed by addition of the dispersant under suitable mixing conditions until the desired viscosity is achieved. The aqueous phase is then added followed by the addition of the HEC. The composition is then thoroughly mixed, with shear, until the desired viscosity is achieved. The water and inorganic salt are preferably added separately, the water being added first followed by addition of the inorganic salt. In this manner the exothermic heat of solution of the salt raises the temperature of the HEC composition, preferably to a temperature greater than about 150° F. If the water and inorganic salt are not added separately, then it is desirable to heat the HEC composition to a temperature of at least 150° F. in order to best activate the HEC for use in heavy brines.

As noted, the composition of the present invention can be mixed with aqueous systems to provide highly useful well drilling and treating fluids. While the aqueous medium can comprise fresh water, preferably the aqueous medium will be one which contains a soluble salt such as for example a soluble salt of an alkali metal, an alkaline earth metal, a Group IB metal, a Group IIB metal, as well as water soluble salts of ammonia and other anions. In particular, oil field brines containing sodium chloride and/or calcium chloride, when admixed with the compositions herein, make excellent workover fluids. The amount of the water soluble salt dissolved in the aqueous medium will vary depending upon the desired density of the well drilling or treating fluid. However, it is common to employ saturated solutions of sodium chloride and/or calcium chloride in preparing such fluids. In preparing aqueous well drilling and treating fluids using the liquid, polymer containing compositions, the amount of the liquid polymer composition added will vary depending upon the viscosity desired. Desirable well drilling and treating fluids can be made by combining an aqueous medium with sufficient liquid, polymer containing composition such that the final mixture contains from about 0.1 to about 2 pounds per barrel (ppb) of HEC.

It is another embodiment of this invention to utilize the HEC composition of this invention to viscosify heavy brines having a density greater than about 13.5 ppg. Such brines are particularly difficult to viscosify at ambient temperatures with HEC, if at all.

The heavy brines for use in the present invention contain two or more soluble salts selected from the group consisting of calcium chloride, calcium bromide, zinc bromide, and mixtures thereof. Brines containing only calcium chloride can be formulated having a density from 8.5 to about 11.7 pounds per gallon (ppg). Brines containing only calcium bromide can be formulated having a density from 8.5 to about 14.2 ppg. However, because calcium chloride is much less expensive than calcium bromide, brines in the density range from about 11.3 to about 15.1 ppg are generally formulated to contain both calcium chloride and calcium bromide, depending on the lowest temperature at which the brine will be used. Brines heavier than about 15.0 ppg are generally formulated to contain calcium chloride, calcium bromide, and zinc bromide, or only calcium bromide and zinc bromide depending on the lowest temperature at which the brine will be used. Brines in the density range from 14.2 ppg to 15.0 ppg may be formulated to contain calcium chloride, calcium bromide, and zinc bromide if brines having a lower crystallization point are desired.

The most difficult brines to viscosify contain zinc bromide, and these brines are preferred for use in the present invention. As indicated, such brines will have a density from about 14.2 to about 19.2 ppg.

Generally, brines of any density within the ranges disclosed are prepared by mixing together various standard, commercially available brines, as follows: calcium chloride brines having a density in the range from about 11.0 to about 11.6 ppg; calcium bromide brine having a density of 14.2 ppg; and a calcium bromide/zinc bromide brine having a density of 19.2 ppg containing about 20% calcium bromide and about 57% zinc bromide. Solid anhydrous calcium chloride and solid calcium bromide are also used in conjunction with these brines to prepare the heavy brines for use in this invention. Standard brine mixing tables are available from the various manufacturers of these brines.

The brines which contain zinc bromide must contain at least 20% by weight zinc bromide as disclosed in our copending patent application Ser. No. 161,444 filed June 20, 1980, incorporated herein by reference for all purposes.

To further illustrate the invention, the following non-limiting examples are presented.

EXAMPLE 1

HEC compositions were prepared by the following procedure:

(1) A stock mixture of diesel oil and methyl benzyl dihydrogenated tallow ammonium bentonite was prepared by mixing 300 grams of diesel oil with 30 grams of GELTONE II for 15 minutes on a Multimixer;

(2) The amount of this stock mixture indicated in Table 1 was added to the amount of diesel oil indicated in this table and mixed for 2 minutes on a Multimixer;

(3) The amount of a 95/5 (weight ratio) mixture of methanol and water indicated in Table 1 was added and mixed for 5 minutes on a Multimixer;

(4) The amount of water indicated in Table 1 was added and mixed 5 minutes on a Multimixer;

(5) The amount of 95% $CaCl_2$ indicated in Table 1 was added and mixed 2 minutes on a Multimixer; and (6) The amount of NATROSOL 250 HHR hydroxyethyl cellulose indicated in Table 1 was added and mixed 20 minutes on a Multimixer.

The samples were evaluated at a concentration of 1 ppb HEC in a 16.0 ppg $CaBr_2/ZnBr_2$ solution. The solutions were hand shaken for about 30 seconds, placed on a Fann VG rheometer at 300 rpm, and the dial reading taken after 1 and 2 hours, after rolling overnight at room temperature, and after rolling overnight at 150° F. The data obtained are given in Table 2.

TABLE 1

| Sample Mark | A | B | C |
|---|---|---|---|
| Diesel Oil | 160 | 152.5 | 145 |
| Stock Mixture | 16.5 | 24.5 | 33 |
| 95/5 $CH_3OH/H_2O$ | 1.5 | 2.25 | 3 |
| Water | 102.6 | 102.6 | 102.6 |
| 95% $CaCl_2$ | 47.4 | 47.4 | 47.4 |
| HEC | 75 | 75 | 75 |

TABLE 2

| Sample Mark | A | B | C |
|---|---|---|---|
| % HEC | 18.6 | 18.5 | 18.5 |
| % Water | 25.5 | 25.4 | 25.3 |
| % $CaCl_2$ (95%) | 11.8 | 11.7 | 11.7 |
| % Gelled Diesel Oil (GDO) | 44.2 | 44.4 | 44.6 |
| % GELTONE II in GDO | 0.84 | 1.25 | 1.66 |
| 300 rpm Fann Dial Reading in 16.0 ppg Solution | | | |
| ppg HEC | 1 | 1 | 1 |
| Initial | 10 | 10 | 10 |
| 1 Hour | 54 | 63 | 60 |
| 2 Hours | 64 | 73 | 70 |
| After Rolling @ R.T. | 64 | 70 | 70 |
| After Rolling @ 150° F. | 72 | 79 | 78 |

EXAMPLE 2

HEC compositions were prepared by the following procedure:

(1) A stock mixture of diesel oil and methyl benzyl dihydrogenated tallow ammonium bentonite was prepared by mixing together with a Premier Dispersator for 20 minutes, 8000 parts by weight of diesel oil, 160 parts by weight of GELTONE II organophilic bentonite, and 45.5 parts by weight of a 95/5 (weight ratio) mixture of methanol and water, the latter functioning as a dispersion aid for the organophilic clay;

(2) To 150 gm of this gelled diesel oil were added 130.9 gm of water and this was mixed for two minutes on a Multimixer;

(3) 19.1 gm of 78% $CaCl_2$ were added and mixed three minutes;

(4) 75 gm of NATROSOL 250 HHR were added. Thickened immediately on mixing. An additional 50 gm of gelled diesel oil were added. Mixed 10 minutes on a Multimixer. Designated Sample D.

(5) Sample E. Prepared as above except used 111.6 gm water, 38.4 gm of 78% $CaCl_2$, and 25 gm additional gelled diesel.

(6) Sample F. prepared as (5) except used 92.3 gm water and 57.7 gm of 78% $CaCl_2$.

(7) Sample G. Prepared as (5) except used 73 gm water and 77 gm 78% $CaCl_2$.

(8) Sample H. Prepared as (5) except that 102.7 gm of water and 47.3 gm of 95% $CaCl_2$ was used.

(9) A portion of samples D, E, F, and G were heated at 150° F. overnight.

These samples were evaluated at a concentration of 1 ppb HEC in a 16.0 ppg $CaBr_2/ZnBr_2$ solution and/or a 19.2 ppg $ZnBr_2$ solution. The solutions were hand shaken for about 30 seconds, placed on a Fann VG rheometer at 300 rpm, and the dial readings taken periodically as indicated in Table 3.

The data obtained, given in Table 3, indicate that the $CaCl_2$ content of the aqueous phase should preferably be greater than about 20%. Heating the samples containing 10% and 20% CaCl₂ in the aqueous phase did not improve their rate of hydration in the 19.2 ppg brine.

EXAMPLE 3

Sample I was prepared by adding 10 gm of NATROSOL 250 HHR to 20 gm of the gelled diesel oil of Example 2 and thereafter adding 20 gm of a 14.2 ppg $CaBr_2$ solution. Shaken by hand for mixing.

Sample J was prepared by mixing together 150 gm of gelled diesel oil and 62.6 gm of water with a Multimixer, adding 72.0 gm of 91% $CaBr_2$, and adding 75 gm of HEC. Mixed with Multimixer.

Sample K was prepared on Sample J except that the water and $CaBr_2$ were mixed and cooled to room temperature being adding this solution to the gelled diesel oil, followed by the HEC.

A portion of samples J and K were heated at 150° F. overnight.

The samples were evaluated in the same manner as in Example 3.

The data obtained, given in Table 4, indicate that a good rate of hydration can be obtained in the 16.0 ppg brine and a fair rate of hydration in the 19.2 ppg brine, provided that the samples are prepared by the preferred process which utilizes dry inorganic salt rather than an inorganic salt solution. The latter HEC composition, sample K, was inferior to sample J prepared using dry powder $CaBr_2$. Heating sample K does increase the rate of hydration of the sample, however.

TABLE 3

| Sample Mark | D | E | F | G | H |
|---|---|---|---|---|---|
| % HEC | 17.65 | 18.75 | 18.75 | 18.75 | 18.75 |
| % Water | 30.8 | 27.9 | 23.1 | 18.25 | 23.1 |
| % CaCl₂ (78%) | 4.5 | 9.6 | 14.4 | 19.25 | 14.4 |
| % Gelled Diesel Oil | 47.05 | 43.75 | 43.75 | 43.75 | 43.75 |
| Temperature, °F. | 120–150* | 135–150* | 150–150* | 155–150* | 170 |
| 300 rpm Fann Dial Reading in 16.0 ppg Solution | | | | | |
| ppb HEC | 1 | 1 | 1 | 1 | 1 |
| Initial | 9 | 8 | 8 | 8 | 8 |
| 10 Minutes | 12 | 11 | 16 | 18 | 17.5 |
| 20 Minutes | 15 | 17 | 24 | 29 | 29.5 |
| 30 Minutes | 18 | 23 | 32 | 40 | 39 |
| 1 Hour | 23 | 38 | 54 | 59 | 60 |
| 2 Hours | — | — | — | — | 69.5 |
| After Rolling @ 150° F. | 70 | 68 | 70 | 72 | 74 |
| 300 rpm Fann Dial Reading in 19.2 ppg Solution | | | | | |
| ppb HEC | 1—1 | 1—1 | 1—1 | 1—1 | 1 |
| Initial | 21–22 | 21–22 | 21–22 | 21–22 | 22 |
| 10 Minutes | 25 — | 24 — | 33 — | 36 — | — |
| 20 Minutes | 30 — | — | 52 — | 50 — | — |
| 30 Minutes | 36–27.5 | 43–36.5 | 74–76.5 | 71–81 | 80 |
| 1 Hour | 48 — | 69 — | 108–110 | 109–114 | 116 |
| 2 Hours | — | — | — | — | 124.5 |
| 24 Hours | — | — | — | — | — |
| After Rolling @ 150° F. | 128–107 | 123–128 | 127–129 | 126–133 | 128 |

*Sample rolled 20 hours @ 150° F.

TABLE 4

| Sample Mark | I | J | J | J | K | K |
|---|---|---|---|---|---|---|
| % HEC | 20 | 20.85 | | | 20.85 | |
| % Water | * | 17.4 | | | 17.4 | |
| % CaBr₂ (91%) | * | 20.0 | | | 20.0 | |
| % Gelled Diesel Oil | 40 | 41.75 | | | 41.75 | |
| 300 rpm Fann Dial Reading in 16.0 ppg Solution | | | | | | |
| ppb HEC | 1 | 1¹ | 1² | 1³ | 1¹ | 1³ |
| Initial | 8 | 8 | 8 | 8 | 8 | |
| 10 Minutes | 15 | 12.5 | — | — | — | — |
| 20 Minutes | 24 | 20 | — | — | — | — |
| 30 Minutes | 28 | 27.5 | — | — | — | — |
| 1 Hour | 36 | 40 | — | 43 | — | 33 |
| 2 Hours | 48 | 53.5 | 65 | 65 | 26 | 52 |
| 24 Hours | 53 | 66 | — | 76 | — | 61 |
| After Rolling @ 150° F. | 69 | 76 | 77 | 75 | 67 | 60 |
| 300 rpm Fann Dial Reading in 19.2 ppg Solution | | | | | | |
| ppb HEC | 1 | 1 | — | — | — | — |
| Initial | 22 | 21.5 | — | — | — | — |
| 10 Minutes | 24 | 27 | — | — | — | — |
| 20 Minutes | 30 | — | — | — | — | — |
| 30 Minutes | 37 | 55 | — | — | — | — |
| 1 Hour | 76 | 86 | — | — | — | — |
| 2 Hours | — | — | — | — | — | — |
| 24 Hours | — | 130 | — | — | — | — |
| After Rolling @ 150° F. | 122 | — | — | — | — | — |

*Contains 40% of a 14.2 ppg $CaBr_2$ solution
¹Sample set for 16 hours before testing.
²Sample set for several days testing.
³Sample heated at 150° F. overnight before testing.

We claim:

1. A viscosifying composition which will hydrate in and viscosify heavy brines having a density greater than about 13.5 ppg at ambient temperature which consists essentially of from about 35% to about 55% by weight of an oleaginous liquid which is a liquid aliphatic or aromatic hydrocarbon, from about 0.25% to about 3% by weight based on said oleaginous liquid of a compatibilizing agent comprising an organophilic clay, from about 15% to about 55% of an aqueous phase comprising water and an inorganic salt which has exothermic heat of solution wherein the concentration of said inorganic salt is greater than about 10% by weight of said aqueous phase, from about 10% to about 30% by weight of hydroxyethyl cellulose, and from about 20% to about 40% by weight, based on the weight of said organophilic clay, of a dispersant selected from the class consisting of aliphatic alcohols having from 1 to 2 carbon atom ketones having from 2 to 5 carbon atoms, and mixtures thereof.

2. The composition of claim 1 containing from about 15% to about 25% by weight hydroxyethyl cellulose, from about 40% to about 50% by weight of said oleaginous liquid, from about 25% to about 45% of an aqueous phase comprising said water and said inorganic salt wherein the concentration of said inorganic salt is greater than about 20% by weight of said aqueous phase, and from about 0.5% to about 2% by weight based on said oleaginous liquid of said compatiblizing agent.

3. The composition of claim 1, or 3 which has been heated to a temperature of at least about 150° F.

4. The composition of claim 3 wherein said temperature results from the solution of said inorganic salt in said water.

5. A well servicing fluid comprising a heavy brine having a density greater than about 13.5 pounds per gallon containing a soluble salt selected from the group consisting of calcium chloride, calcium bromide, zinc bromide, and mixtures thereof, and a viscosifying amount of the viscosifying composition of claim 1, 2, 3, or 4.

6. A method of activating hydroxyethyl cellulose, such that said hydroxyethyl cellulose will hydrate in heavy brines having a density greater than about 13.5 ppg at ambient temperatures which comprises admixing from about 35% to about 55% of an oleaginous liquid which is a liquid aliphatic or aromatic hydrocarbon, from about 0.25% to about 3% by weight based on said oleaginous liquid of a compatibilizing agent comprising an organophilic clay, and from 20% to about 40% by weight, based on the weight of said organophilic clay, of a dispersant selected from the class consisting of aliphatic alcohols having from 1 to 2 carbon atom ketones having from 2 to 5 carbon atoms, and mixtures thereof, together to form a viscous slurry, admixing therewith from about 15% to about 55% of an aqueous phase comprising water and an inorganic salt which has an exothermic heat of solution, wherein the concentration of said inorganic salt is greater than about 10% by weight of said aqueous phase, said water being added first followed by the addition of said inorganic salt, and thereafter admixing from about 10% to about 30% by weight hydroxyethyl cellulose to form a viscous pourable composition.

7. The method of claim 6 wherein said viscous pourable composition contains from about 15% to about 25% by weight hydroxyethyl cellulose, from about 40% to about 50% by weight of said oleaginous liquid, from about 25% to about 45% of an aqueous phase comprising said water and said inorganic salt wherein the concentration of said inorganic salt is greater than about 20% by weight of said aqueous phase, and from about 0.5% to about 2% by weight based on said oleaginous liquid of said compatiblizing agent.

8. The method of claim 6, or 7 additionally comprising heating said viscous pourable composition to a temperature of at least 150° F.

9. The method of claim 8 wherein said temperature results from the solution of said inorganic salt in said water.

10. A well servicing fluid comprising a heavy brine having a density greater than about 13.5 pounds per gallon containing a soluble salt selected from the group consisting of calcium chloride, calcium bromide, zinc bromide, and mixtures thereof and a viscosifying amount of the viscous pourable composition prepared by the method of claim 6, 7, 8, or 9.

* * * * *